United States Patent [19]
Kapany

[11] 3,936,157
[45] Feb. 3, 1976

[54] HIGH EFFICIENCY LIGHT TRANSMITTING WINDOW PANEL

[75] Inventor: Narinder S. Kapany, Woodside, Calif.

[73] Assignee: Kaptron, Inc., Palo Alto, Calif.

[22] Filed: Apr. 22, 1974

[21] Appl. No.: 462,856

[52] U.S. Cl. .............................................. 350/258
[51] Int. Cl.² ........................................... G02B 17/00
[58] Field of Search .......... 350/258, 259, 260, 261, 350/262, 263, 264, 265

[56] References Cited
UNITED STATES PATENTS

| 622,506 | 4/1899 | Manning ......................... 350/262 X |
| 982,772 | 1/1911 | Wadsworth ..................... 350/262 X |
| 2,327,918 | 8/1943 | Miller .................................. 350/263 |
| 2,506,951 | 5/1950 | Doane ............................. 350/259 X |
| 2,828,235 | 3/1958 | Holland .......................... 350/258 X |
| 3,537,944 | 11/1970 | Grubb .............................. 350/259 X |

FOREIGN PATENTS OR APPLICATIONS 404,303  11/1909  France ................................ 352/258

*Primary Examiner*—Monroe H. Hayes
*Attorney, Agent, or Firm*—Limbach, Limbach & Sutton

[57] ABSTRACT

The window panel includes a plurality of sets of reflecting surfaces which are spaced apart from and facing each other and which transmit the incident light at least in part by multiple reflections. The sets of reflecting surfaces are arranged parallel to each other in a panel. In at least one embodiment the sets of opposed reflecting surfaces converge in the direction of incident light travel through the window panel and infrared reflecting means are provided to reflect infrared light attempting to pass through the window panel in a direction opposite to the direction of travel of the incident light.

10 Claims, 13 Drawing Figures

$\sin \theta = (n^2 - 1)^{1/2}$ $\sin \theta_1 = (n_2^2 - n_3^2)^{1/2}$

WHEN $\theta_3 = 90°$ THE LIGHT IS TOTALLY REFLECTED INTERNALLY IN THE RIB 28

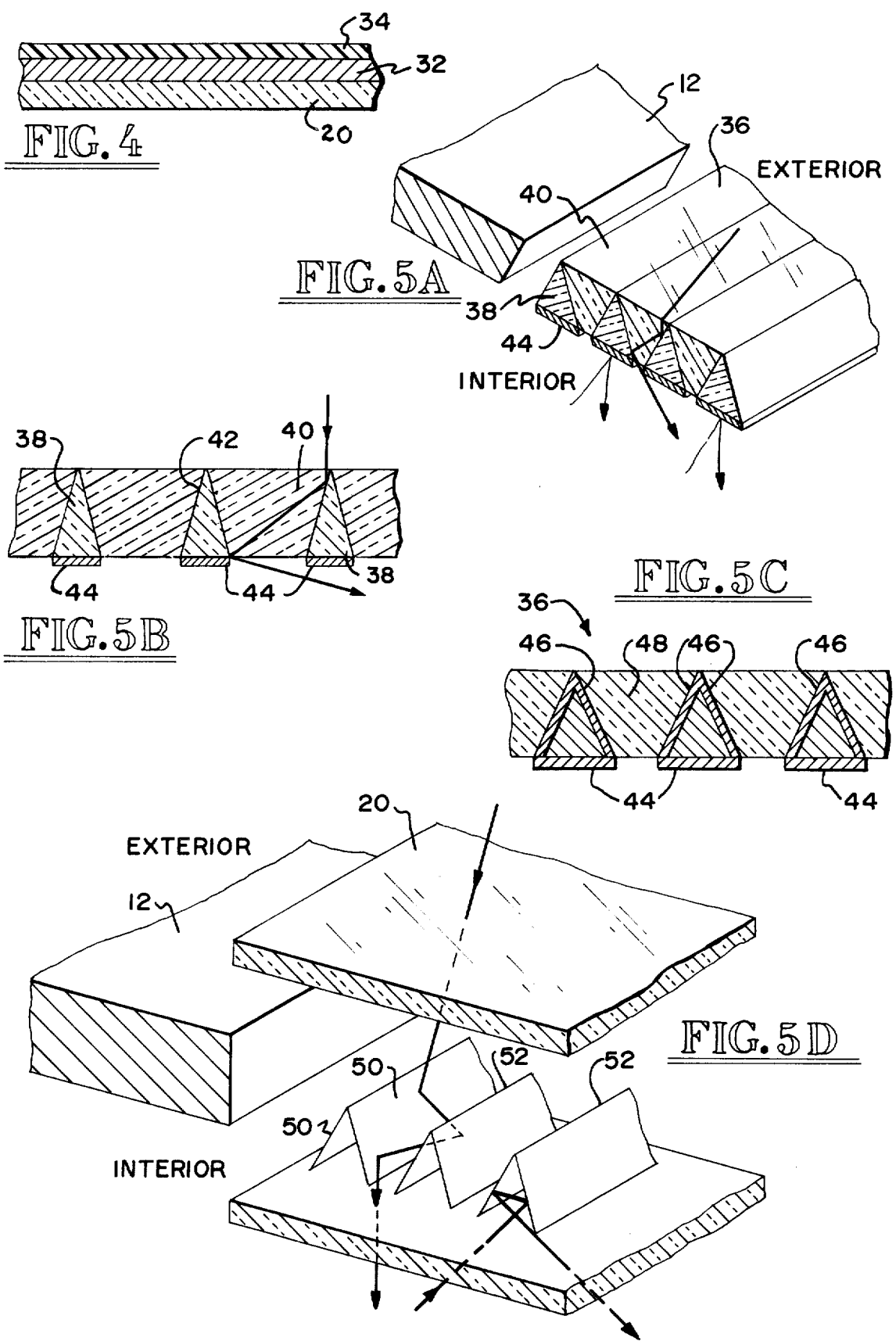

$$\sin\theta_{\text{MAX}} = \frac{d_2}{d_1}$$

$$\sin\theta_{\text{MAX}} = \frac{d_2}{d_1}(n^2 - n'^2)^{\frac{1}{2}}$$

$n > n'$

HIGH EFFICIENCY LIGHT TRANSMITTING WINDOW PANEL

CROSS-REFERENCE TO RELATED APPLICATION

The present application is related in part to the applicant's co-pending application, Ser. No. 462,870, filed Apr. 22, 1974 and entitled "HIGH EFFICIENCY SOLAR PANEL".

BACKGROUND OF THE INVENTION

The invention relates to a window panel and more particularly to a high efficiency light transmitting window panel for passing incident solar light into a room while simultaneously blocking the escape of heat energy by radiation, convection or conduction from the room.

In the design of buildings, it is desirable that the windows efficiently pass solar radiation while blocking the escape of heat from the inside of the building by either radiation, conduction or convection. Furthermore, it is desirable that such solar radiation be transmitted through the window over as wide a range of incident angles as possible.

In some prior art windows one or more panes of transparent glass or plastic are separated by air. Such double pane windows are somewhat effective in blocking the escape of heat by means of conduction since the air chamber between the panes acts as a barrier to direct conductive heat loss. However, convective air currents within the air chamber are generated by the temperature differential between the panes and this causes a significant heat loss. Also heat generated or reemitted (in the form of infrared light, for example) from within the building passes easily through the window, causing further heat loss. Still another problem of such double pane windows is that much of the light is lost which strikes the window at large incident angles (measured with respect to the normal to the outer pane.) Thus, the closer the incident light comes to being tangential to the window, the less efficient the window becomes in transmitting the incident light.

The light transmitting characteristics of the ideal window should be independent of the angle of incidence or polarization, thus making the window useful even on a cloudy day. The window should also be made of low cost materials without sacrificing sturdiness.

Some of these requirements are contradictory. For example, in order to make the window sturdy or in order to make it more effective in blocking the escape of heat energy, some lower light transmitting qualities than relatively thinner windows. Thus, the light transmitting capability is degraded to improve the capability to block the escape of heat energy. Furthermore, when the window is made relatively thick the light acceptance angle properties may be degraded in some prior art arrangements.

SUMMARY OF THE INVENTION

The above described disadvantages of the prior art are overcome and the requirements for a highly efficient incident light transmitting window panel are met by the present invention comprising a plurality of parallel sets of opposed reflecting surfaces arranged in a panel which transmit the incident light through the panel at least in part by multiple reflections. By "opposed reflecting surfaces" is meant that separate ones of the plurality of reflective surfaces are spaced apart from and face each other, either directly or obliquely, so that multiple reflections can occur. In some preferred embodiments of the invention, the plurality of opposed reflecting surfaces converge in the overall direction of the incident light travel through the window. In one such embodiment, for example, the opposed reflecting surfaces are arranged in V-shaped, parallel grooves.

In some preferred embodiments means are also provided to reflect infrared light striking the panel. In one type of embodiment the infrared light striking the panel from a direction opposite to that of the incident light is reflected. For example, in one such embodiment of this type a plurality of parallel, triangularly shaped wedges are provided for supporting the opposed reflecting surfaces. Each wedge has one apex pointing generally toward the source of incident light and supports a pair of reflecting surfaces which diverge from the one apex in the direction of incident light travel through the window. Thus, in effect, the set of reflecting surfaces supported by each pair of adjacent wedges which face each other converge in the direction of light travel through the window. The means for reflecting the infrared radiation comprise infrared reflecting surfaces which are disposed between the other two apexes of each wedge, that is, the infrared reflecting surfaces are arranged so as to face the interior of the building structure in which the window is mounted and are supported adjacent to the flat surface of the bottom of each wedge.

The window in other embodiments of the invention comprises a pair of thin, transparent sheets which are separated by a plurality of ribs made of light transmitting material arranged to transmit the incident light striking the ribbed portion of the window within a predetermined angle of acceptance by means of multiple, total internal reflections. In one embodiment, for example, the ribs take the form of a plurality of transparent columns while in other embodiments the ribs are in the form of transparent zig-zag walls. In these embodiments the window portion preferably further includes means for segmenting air spaces between the sheets to reduce convection heat losses and to better distribute the mechanical load applied to the window.

In still other embodiments, the "ribs" are in the form of light transmitting honeycomb cells which also segment the air space between the sheets. These forms of construction have the advantages of light weight, sturdiness, high light transmission and relatively low cost.

Many of the above described features of the invention may be utilized independently of some of the others, but they are preferably combined into a window which is highly efficient in transmitting incident solar radiation while simultaneously blocking the escape of heat.

It is, therefore, an object of the present invention to provide a window which is highly efficient in transmitting light over a wide range of incident angles;

It is another object of the invention to provide a window which has high light transmissive qualities while simultaneously being an effective barrier to the escape of heat energy;

It is a further object of the invention to provide a high efficiency window panel wherein the panel is low cost, lightweight and sturdy; and It is a still further objec of the invention to provide a high efficiency window panel which has low heat losses due to radiation, convection and conduction.

The foregoing and other objectives, features and advantages of the invention will be more readily understood upon consideration of the following detailed description of certain preferred mbodiments of the invention, taken in conjunction with the accompanying drawings.

BRIEF DESCRIPTION OF THE DRAWINGS

FIG. 4 is an enlarged vertical view, in section, and with portions broken away of a window sheet of the embodiment of FIG. 1;

FIG. 5a is a perspective view of a fourth alternative embodiment, with portions broken away;

FIG. 5b is an enlarged vertical view, in section, of the structure depicted in FIG. 5a;

FIG. 5c is an enlarged vertical view, in section, of a modification of the structure depicted in FIG. 5b;

FIG. 5d is a perspective view of a fifth embodiment of the invention, with portions broken away and in section;

DETAILED DESCRIPTION OF CERTAIN PREFERRED EMBODIMENTS

Figure 1:
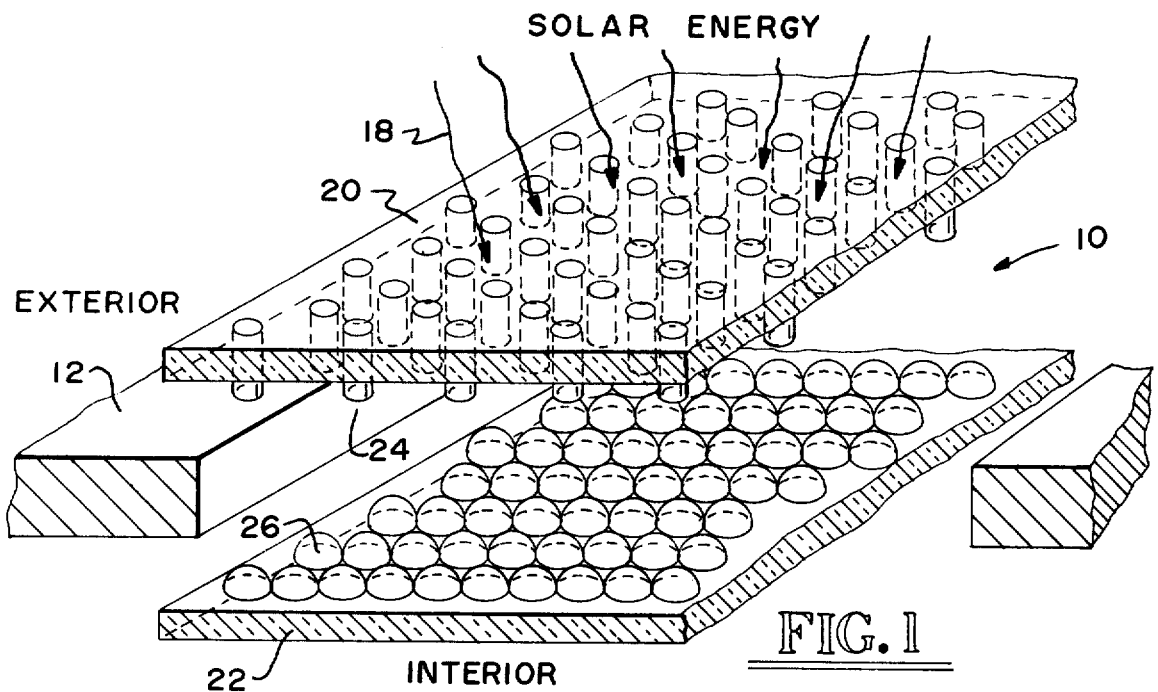
FIG. 1 is an exploded, perspective view, partly in section and with portions broken away of a window panel according to a first embodiment of the invention together with the building wall in which it is intended to be mounted.

Referring now more particularly to FIG. 1, the window panel 10 of the invention is mounted in a wall of a structure 12 and includes a pair of thin, transparent sheets 20 and 22 which are spaced apart by a plurality of upstanding columns or ribs 24 which are also made of lightweight, light transmitting material and preferably of a material which has high optical transmission qualities. In practice, the material chosen for the sheets 20 and 22 and the ribs 24 may be lightweight plastic. In other embodiments, the top sheet 20 may be glass for ruggedness.

As mentioned above, the window portion must be designed to accept solar radiation 18 over as wide an angle of incidence as possible. It also must be designed to prevent heat loss through reradiation from the interior of the structure 12 and heat loss due to conduction and air convection currents either between the sheets 20 and 22 or in the region immediately adjacent the bottom sheet 22 due to the temperature differential across the window 10.

Means are provided for segmenting the air space between the sheets 20 and 22 to reduce heat loss due to conduction as well as convection air currents which would otherwise develop between the two sheets. In the embodiment depicted in FIG. 1, the means for segmenting the space comprises a plurality of transparent bubbles 26 on the upper surface of the sheet 22. The bubbles 26 may be made of a transparent material such as plastic and pressed against the flat panels to reduce reflection losses at curved surfaces.

Figure 2A:
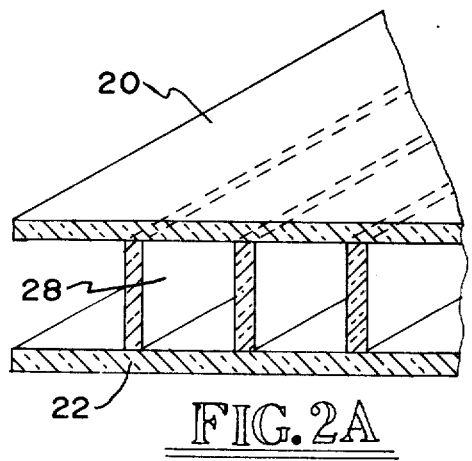
FIGS. 2a and 2b are enlarged perspective views, partly in section and with portions broken away of second and third alternative window embodiments.
Figure 2B:
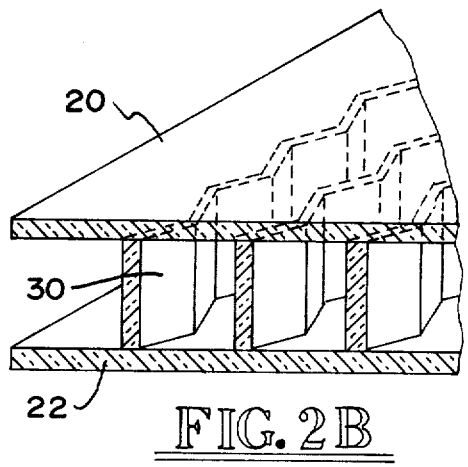

Referring now more particularly to FIGS. 2a and 2b, other types of columns and air space segmenting are depicted. In the embodiment of FIG. 2a the window sheets 20 and 22 are separated by a plurality of thin sheets 28 turned on edge to form a plurality of parellel ribs which extend the length of the sheets 20 and 22. In the modified embodiment depicted in FIG. 2b, the ribs are a plurality of sheets 30 turned on edge and bent in a zig-zag fashion. In the embodiments of FIGS. 1, 2a and 2b the ribs 24, 28 and 30 are made of lightweight, optically transparent material. In still other embodiments the light transmitting structural support between the sheets may be a honeycomb or other shapes.

Figure 3A:
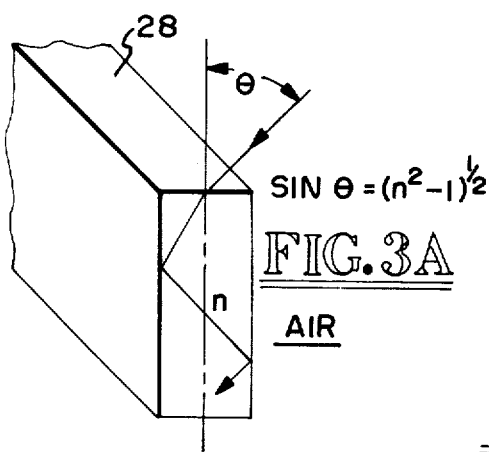
FIGS. 3a and 3b are enlarged perspective views, with portions broken away and in section of the rib portions of the window panels depicted in FIGS. 2a and 2b.
Figure 3B:
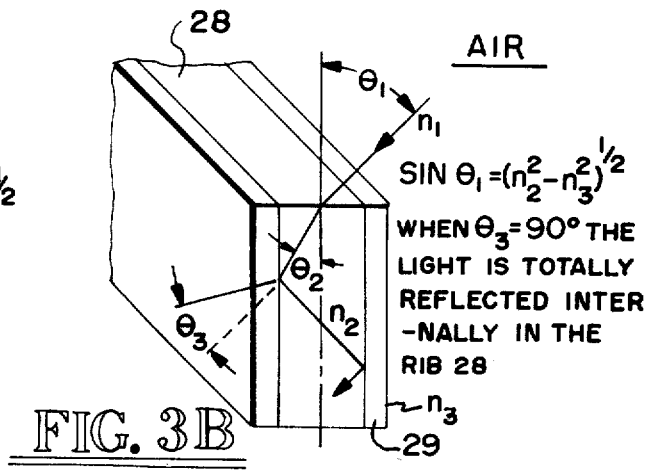

One purpose of having the ribs 24, 28 or 30, in addition to supporting and separating the sheets 20 and 22 to form an insulating air space, is also to provide means for transmitting incident light striking the top sheet 20 to and through the bottom sheet 22. By providing these ribs, the incident light is accepted over a wider incident angle than if the ribs were opaque and the only light transmitted was light which managed to penetrate both the top and bottom sheets 20 and 22. From Snell's law that $n_1 \sin\theta_1 = n_2 \sin\theta_2$ (where $\theta_1$ and $\theta_2$ are the incident angle and the refracted angle, respectively) and the principle of total internal reflection that the refracted angle ($\theta_3$) for light leaving the material having the higher index ($n_2$) of refraction into a material (such as a coating) of a lower refractive index ($n_3$) must be 90° (see FIG. 3b), then $$\theta_{1_{max}} = \sin^{-1}\{(n_2)^2 - (n_3)^2\}^{1/2}$$

where $\theta_{1_{max}}$ = maximum light acceptance angle for total internal reflection $n_1 = 1$ (for air)

$n_2$ = refractive index of material of rib 28, and $n_3$ = refractive index of a protective dielectric coating 29 on rib 28, where rib 28 is uncoated, $n_3 = 1$ and $$\theta_{1_{max}} = \sin^{-1}\{(n_2)^2 - 1\}^{1/2}$$

Note that $\theta$ is measured with respect to the normal of the top surface of the rib, and therefore the actual maximum acceptance angle in the above examples is $2\theta$. In the case of wall type ribs, such as ribs 28 and 30, there is some advantage in aligning their longitudinal axis with the direction of travel of the sun over the panel. When this is done the bulk of the incident light will always be within the acceptance angle since the acceptance angle for light contained in all planes which also contain the longitudinal axis is substantially 180°.

While the above described mathematical relationships between the angle of acceptance and the indices of refraction are given with respect to the rib 28, it should be apparent that substantially similar relationships apply to the ribs 24 and 30. Thus, light is transferred through the window portion by means of multiple, total internal reflections within the ribs 24, 28 or 30.

In some embodiments it is preferable to coat the sheets 20 and 22 with a transparent hard coating 32 in order to prevent scratching and an anti-reflection coating 34 to minimize reflection losses (FIG. 4). Furthermore, in some embodiments it is preferable to stack a number of window sections 10 to minimize heat losses due to reflection and reradiation from the interior of the structure 12.

Referring now more particularly to FIGS. 5a and 5b, still another embodiment of the window section 10 is illustrated. In the embodiment of FIGS. 5a and 5b, a panel 36 of optical valves admit incident light to the structure but blocks the escape of a large portion of infrared radiation emitted from within the interior of the structure 12. The basic design of each optical valve in the panel 36 is to provide a plurality of opposed reflecting surfaces which converge in the overall direction of incident light travel through the window 10. The reflecting surfaces of each optical valve of the panel 36 may be in the form of a plurality of reflecting V-grooves or in a plurality of honeycomb cells but both arrangements have wider openings at the top surface, that is, the surface first struck by the incident solar radiation, than at the bottom surface, that is, the surface closest to the interior of the structure 12. The optical valve panel 36 may be composed of combinations of metal and dielectric materials.

The optical valve panel 36 may be substituted for the panel 10 but is more preferably used in conjunction with it. For example, in some embodiments the panel 10 and the optical valve panel 36 are stacked in sandwich fashion with the panel 10 on the exterior. This embodiment benefits from the combined characteristics of both windows, namely the high insulative qualities to convective and conductive heat loss of the panel 10 and the barrier qualities of the optical valve panel 36 to escaping infrared radiation from the interior of the structure 12. Numerous other combinations of these embodiments to satisfy specific light transmitting and heat conservation requirements will be apparent to those skilled in the art.

In the embodiment depicted in FIGS. 5a and 5b, a plurality of inwardly converging V-grooves are formed by constructing the panel 36 of outwardly pointing, triangularly shaped wedges 38 of low refractive index material interspersed between inwardly pointing, truncated, triangularly shaped wedges 40 of high refractive index material. The terms inwardly and outwardly as used here are with respect to the interior and exterior of the structure 12. The incident solar radiation is transmitted through the high refractive index medium 40 and is reflected at each interface formed between a wedge of high refractive index material 40 and a wedge of low refractive index material 38. Thus, these interfaces formed by the discontinuities in the refractive indices are effectively reflective surfaces 42 for the incident solar radiation. Such a reflecting surface 42 if formed on the opposite, inwardly converging sides of each wedge 40 and thus light entering from the exterior surface of the wedge 40 is multiply reflected inwardly.

In order to prevent the escape of infrared radiation from the interior of the structure 12, a plurality of infrared reflecting surfaces 44 which face the interior of the structure 12 are provided on the bottom of each wedge 38. Therefore the optical valve panel 36 is highly transmitting for incident solar light coming from the exterior of the structure 12 and highly reflecting for the infrared emitted from the interior of the structure 12 in the opposite direction.

Referring now more particularly to FIGS. 5c and 5d, metal or multiple dielectric layers are used for reflection in place of the wedges 38 and 40 of transparent material. In particular, in the embodiment of FIG. 5c a plurality of opposed reflecting surfaces 46 are embedded in a transparent medium 48. The opposed reflecting surfaces 46 are inclined to converge inwardly. The infrared reflecting surfaces 44 are placed on the interior surface of the panel of material 48 between pairs of opposed converging surfaces 46 in a manner similar to the embodiment of FIGS. 5a and 5b.

In the embodiment depicted in FIG. 5d, thin flat laminates 50 are attached together along one edge to form an inwardly opening V-shaped channel 52. A plurality of the V-shaped channels 52 are aligned parallel to each other and extend along the length of the window panel 10. The opposed reflecting surfaces of each adjacent pair of reflecting channels 52 form a pair of inwardly converging reflecting surfaces as in the other optical valve embodiments described above with reference to FIGS. 5b and 6c. The inner end of each V-shaped channel 52 is open so that infrared radiation emitted from within the structure 12 strikes the interior surfaces of the V-shaped channel 52 and is reflected back by multiple reflections within the V-shaped channels 52 as indicated by the dashed line path in FIG. 5d. The infrared reflecting surfaces may take different shapes in other embodiments. For example, they may be flat, corner-cubed or even hemi-cylindrically concave and are not necessarily the backsides of the laminates 50.

The reflective surfaces 46 and 50 may be polished metal or multiple layers of dielectric coatings over metal surfaces to form a reflective laminate. One advantage of dielectric coatings over metal surfaces is that dielectric coatings can be made with a higher reflection coefficient than the metal surfaces alone but generally for smaller incident angles and wavelength ranges.

One important consideration in the design of these optical valves of the panel 36 is the acceptance angle for solar radiation. If the light striking the exterior of the panel 36 is at too large an angle with respect to the normal to the panel 36, then the bulk of the incident light will be reflected or refracted out rather than be passed through it by multiple reflections. In all planes containing the apex line of the V-groove, however, all incident angles of solar radiation are accepted. With reference to FIG. 5a, incident light striking the panel 36 in a plane which is normal to the panel 36 and which passes through the lower apex of any given wedge 40 will be accepted. Thus, it is preferable to align the longitudinal axes of the optical valves in the panel 36 with the direction of the sun's travel over the panel 36.

Figure 6A:
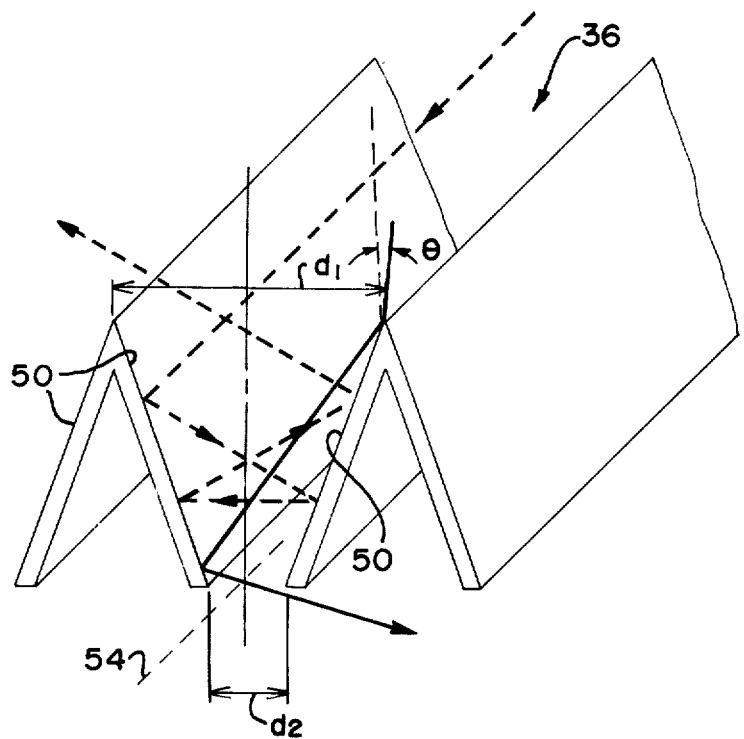
FIGS. 6a and 6b are diagrammatic illustrations for use in explaining the operation of the window panels depicted in FIGS. 5a–5d.

Referring now more particularly to FIG. 6a, which is an enlarged and perspective view of the embodiment depicted in FIG. 5d, the apex line is defined as a line 54 which is centered between the opposed reflecting surfaces 50 at their closest points and parallel to the exterior surface of the panel 36. For light striking the exterior of the panel 36 in a plane which is normal to the apex line 54 it can be shown that the acceptance angle of the incident light is:

$$\theta_{1\,max} = \sin^{-1}\left(\frac{d_2}{d_1}\right)$$

and the full acceptance angle, $2\theta_{max}$ (i.e. the light striking from either side of a line normal to the top of the panel 36) is:

$$2\theta_{1\,max} = 2\sin^{-1}\left(\frac{d_2}{d_1}\right)$$

where $d_2$ is the width of the smaller end, and $d_1$ is the width of the larger end of the V-shaped groove formed by the opposed reflecting surfaces 50. For any larger angle the incident light will not be multiply reflected toward the apex but instead will be reflected back out of the V-groove.

Figure 6B:
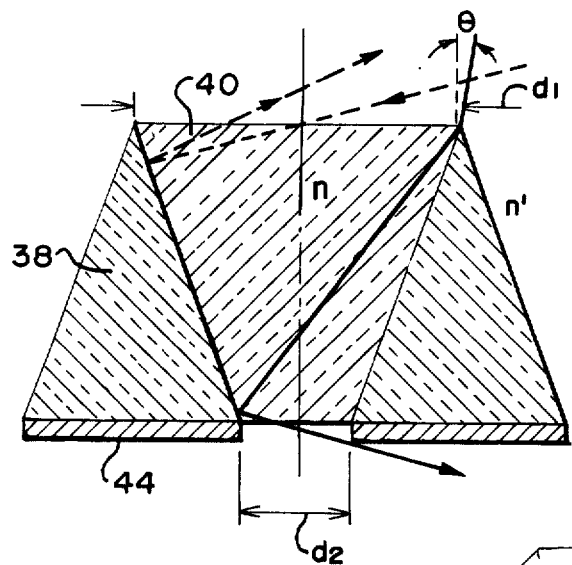

When the groove consists of two different dielectrics, as depicted in FIGS. 6b and 5b, for example, the full acceptance angle can be shown* to be:

$$2\theta_{max} = 2\sin^{-1}\left\{\frac{d_2}{d_1}(n^2 - n'^2)^{1/2}\right\}$$

where $n$ = refractive index of wedge 40, and $n'$ = refractive index of wedge 38.

*See *Fiber Optics*, pp. 18-21, by N. S. Kapany, the present applicant (Academic Press, New York 1967).

Figure 7:
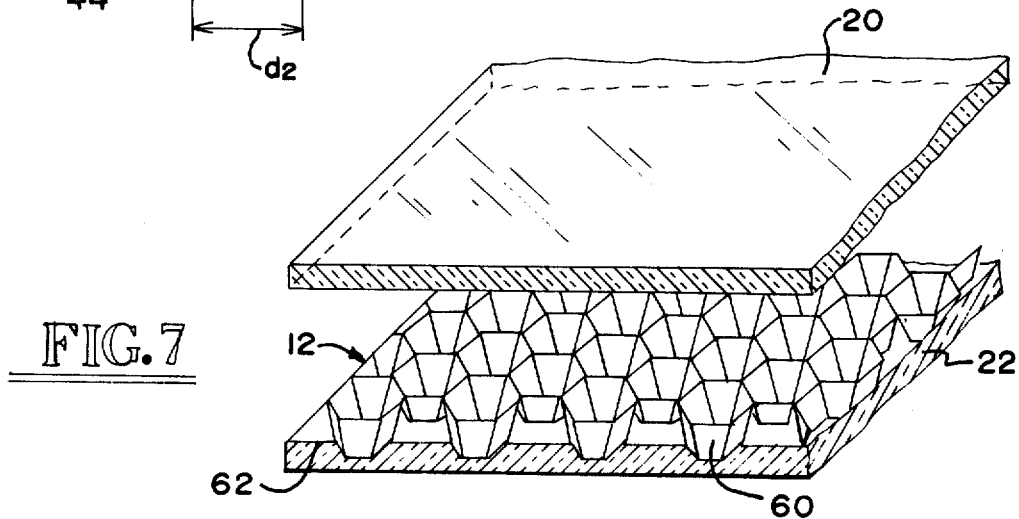
FIG. 7 is a perspective view of a sixth embodiment of the invention, with portions broken away and in section.

While in the above described embodiments, the optical valve panel 36 is illustrated in the figures as comprising a plurality of V-grooves, in other embodiments (FIG. 7), as mentioned above, it has a honeycomb cell structure 60 wherein the opening closest to the incident light is wider than the opening which is closest to the interior of the structure 12. The opposed plane surfaces inside each honeycomb cell of the structure 60 provide a plurality of opposed reflecting surfaces which operate in substantially the same manner as the V-groove arrangements shown above so that a detailed description of the honeycomb arrangement will be omitted. The honeycomb structure 60 may be situated between the sheets 20 and 22 (as shown in FIG. 7) or it may be a separate panel below the sheet 22. The plane surface area 62 of the structure 60 below and between the honeycomb cells is preferably a reflecting surface for the infrared radiation emitted from within the structure 12.

One advantage of this design over the V-groove or wedge configurations is that it is non-axially directional. As explained above, the V-groove or wedge structures of FIGS. 5a-5d preferably are utilized with their longitudinal axes aligned with the sun's direction of travel over the panel so that the bulk of the incident light will always strike within the incident angle of acceptance. With the honeycomb structure 60, however, the sun's direction of travel is not material since light is accepted in the same manner for any given incident angle with respect to the normal to the panel for all radial directions about the panel.

Another advantage of the honeycomb cell structure 60 over some othe designs is that it is very effective in segmenting the air space between the sheets 20 and 22 (in FIG. 7 embodiment or below sheet 22 in other embodiments to reduce convective heat losses.

Although the panel embodiments have been described above as generally flat, in other embodiments they may be curved to give a concentrated effect. Furthermore, while the panel has been described with respect to its use in an external structural wall it should be apparent that it is equally suitable for use in internal structural walls and with other than solar light.

In all of these embodiments it has been assumed that the desired objective is to admit light while retaining heat. In other applications, however, it may be desirable to reverse the orientation of these embodiments so as to keep out heat and let a portion of the incident light into the interior of the building structure.

The terms and expressions which have been employed here are used as terms of description and not of limitation, and there is no intention, in the use of such terms and expressions, of excluding equivalents of the features shown and described, or portions thereof, it being recognized that various modifications are possible within the scope of the invention claimed.

What is claimed is:

1. A window panel comprising a pair of spaced apart transparent sheets, perpendicular supports for keeping the sheets spaced apart and for segmenting the air space between the sheets to prevent heat loss due to convective air currents, the supports being made of light transmitting material arranged to transmit incident light striking the window within a predetermined angle of acceptance through the window panel by means of multiple total internal reflections.

2. A window panel for use in a hollow structure for transmitting incident light into the interior of the structure comprising a plurality of opposed reflecting surfaces arranged in a panel for transmitting the incident light into the structure by multiple reflections, the panel of reflecting surfaces including a first set of elongated, parallel, triangularly shaped, reflectively surfaced wedges, each wedge having three apexes with one apex pointing in the direction toward the incident light, means for supporting the wedges so that the two apexes of each wedge which are opposite to the one apex are spaced apart from the corresponding apexes of adjacent wedges to thereby define a plurality of truncated, V-shaped, reflective surface channels, and infrared reflecting means disposed adajcent to the two opposite apexes of each wedge for reflecting back infrared light emitted from within the structure.

3. A window panel as recited in claim 2 wherein the first set of wedges are made of a light transmitting material and further comprising a second set of truncated, triangularly shaped wedges oriented in the opposite direction to the first set of wedges and interspersed between them, the second set of wedges being made of a light transmitting material having a higher refractive index than the material of the first set of wedges so that the interfaces between the wedges of the first and second sets form the plurality of V-shaped reflective surface channels.

4. A window panel as recited in claim 2 wherein the reflective surfaces of the wedges comprise multiply layered all dielectric coatings.

5. A window panel as recited in claim 2 wherein the reflective surfaces of the wedges comprise multiply layered metal-dielectric coatings.

6. A window panel for use in a hollow structure for transmitting incident light into the interior of the structure comprising a plurality of opposed reflecting surfaces arranged in a panel for transmitting the incident light into the structure by multiple, total internal reflections, the panel of reflecting surfaces including a parallel set of truncated, triangularly shaped wedges, each wedge having three apexes with one apex pointing in the direction away from the incident light, means for supporting the wedges so that the one apex of each wedge is spaced apart from the corresponding apex of adjacent wedges to thereby define a plurality of V-shaped channels, the wedges being made of a first light transmitting material, a second light transmitting material, of a lower refractive index than the refractive index of the first light transmitting material, the second light transmitting material filling the V-shaped channels such that reflective, dielectric surfaces which converge toward the interior of the structure are formed at the interfaces of the wedges and the second light transmitting material, the converging reflective surfaces serving to condense the bulk of the incident light so that is passes solely through the wedges.

7. A window panel as recited in claim 6 further comprising a pair of spaced apart transparent sheets and spaced apart support columns, arranged perpendicularly to the sheets, for keeping the sheets spaced apart, the supports being made of light transmitting material arranged to transmit incident light striking the window within a predetermined angle of acceptance through the window panel by means of multiple, total internal reflections.

8. A window panel as recited in claim 7 wherein the supports are in the shape of rods.

9. A window panel as recited in claim 7 wherein the supports are in the shape of honeycomb cells.

10. A window panel as recited in claim 7 further comprising means for segmenting air spaces between the sheets.

* * * * *